(12) United States Patent
Sasaki

(10) Patent No.: US 8,884,895 B2
(45) Date of Patent: Nov. 11, 2014

(54) INPUT APPARATUS

(75) Inventor: Yasushi Sasaki, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 13/265,748

(22) PCT Filed: Apr. 23, 2010

(86) PCT No.: PCT/JP2010/002964
§ 371 (c)(1),
(2), (4) Date: Oct. 21, 2011

(87) PCT Pub. No.: WO2010/122813
PCT Pub. Date: Oct. 28, 2010

(65) Prior Publication Data
US 2012/0038579 A1  Feb. 16, 2012

(51) Int. Cl.
*G06F 3/041* (2006.01)
*G06F 3/0488* (2013.01)
*G06F 3/01* (2006.01)

(52) U.S. Cl.
CPC ............ *G06F 3/0414* (2013.01); *G06F 3/0488* (2013.01); *G06F 3/016* (2013.01)
USPC ........... 345/173; 345/174; 345/156; 345/157; 715/838; 715/835; 715/841; 715/844; 715/700

(58) Field of Classification Search
USPC .......... 345/173, 174, 156, 157; 715/838, 835, 715/841, 844, 700
See application file for complete search history.

(56) References Cited

U.S. PATENT DOCUMENTS

| 5,745,096 | A  | * | 4/1998 | Ludolph et al. ............... 715/764 |
| 6,307,545 | B1 | * | 10/2001 | Conrad et al. ................ 715/781 |
| 7,683,889 | B2 | * | 3/2010 | Rimas Ribikauskas et al. .............................. 345/173 |
| 2007/0137901 | A1 | * | 6/2007 | Chen .......................... 178/18.01 |
| 2008/0024454 | A1 | * | 1/2008 | Everest ......................... 345/173 |
| 2008/0180402 | A1 |   | 7/2008 | Yoo et al. |

(Continued)

FOREIGN PATENT DOCUMENTS

| JP | 2008016053 | * | 1/2008 | ............. G06F 3/041 |
| JP | 2008-181523 A |   | 7/2008 | |

(Continued)

OTHER PUBLICATIONS

International Search Report; PCT/JP2010/002964; Jun. 22, 2010.
Japanese Office Action "Notification of Reason for Refusal" dated Mar. 12, 2013, which corresponds to Japanese Patent Application No. 2011-510236 and is related to U.S. Appl. No. 13/265,748 with translation.

*Primary Examiner* — Olga Merkoulova
(74) *Attorney, Agent, or Firm* — Studebaker & Brackett PC

(57) ABSTRACT

Provided is an input apparatus capable of handling operation mistakes (erroneous operations) unintentionally performed by a user. An input apparatus 10 has a display unit 32 configured to display objects of folders arranged in a hierarchical structure, an input unit 34 configured to receive a pressing input to the display unit 32, a load detection unit 40 configured to detect a pressure load on the input unit 34, and a control unit 20, if the load detection unit 40 continuously detects a pressure load satisfying a first load standard for a predetermined period while the display unit 32 is displaying an object of an open folder and the input unit 34 is receiving the pressing input at a position corresponding to an object of another folder different from the open folder, configured to control to open the another folder.

1 Claim, 13 Drawing Sheets

(56) References Cited

U.S. PATENT DOCUMENTS

| | | | |
|---|---|---|---|
| 2009/0135147 A1* | 5/2009 | Hsu et al. | 345/173 |
| 2009/0237374 A1* | 9/2009 | Li et al. | 345/174 |
| 2010/0271312 A1* | 10/2010 | Alameh et al. | 345/173 |
| 2012/0038580 A1* | 2/2012 | Sasaki | 345/173 |

FOREIGN PATENT DOCUMENTS

| | | |
|---|---|---|
| JP | 2008-250924 A | 10/2008 |
| JP | 2009-017322 A | 1/2009 |
| JP | 2006-311224 A | 11/2009 |
| WO | 2008/016387 A1 | 2/2008 |

\* cited by examiner

FIG. 3
Prior Art
(A)
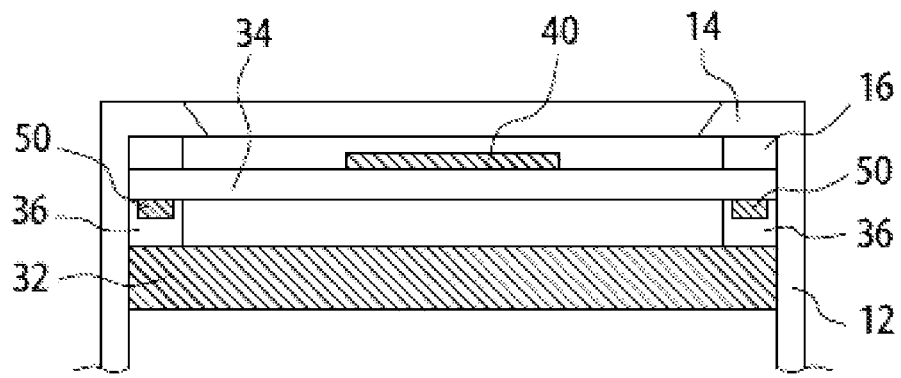
(B)
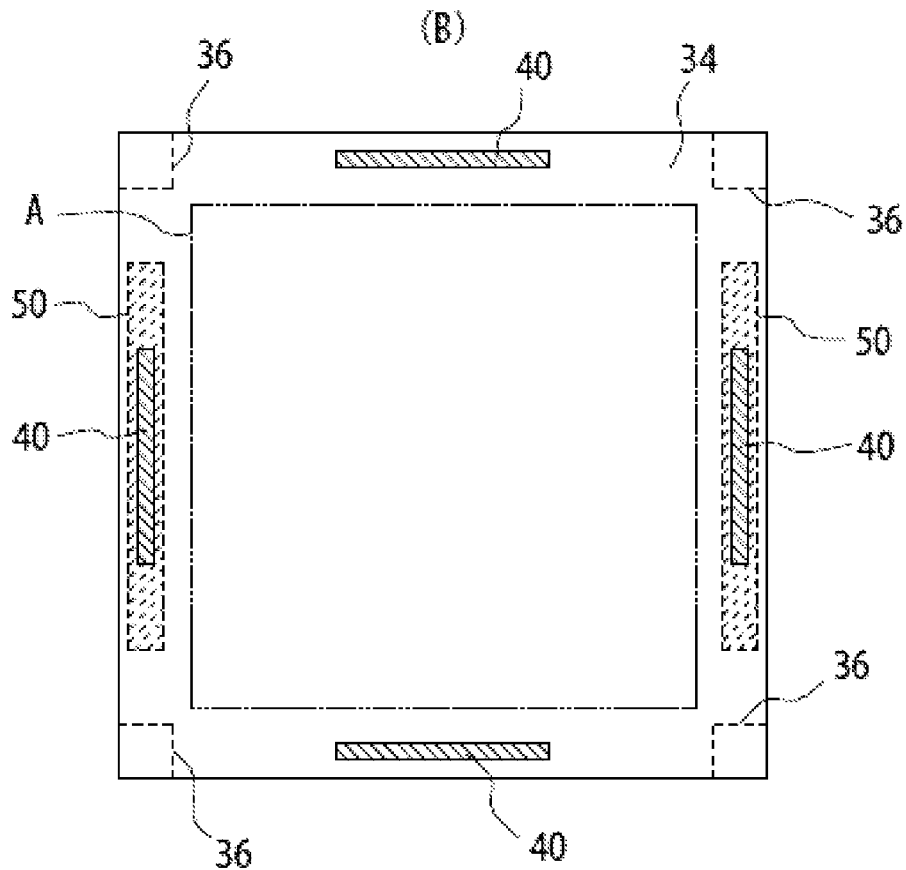

FIG. 8
Prior Art
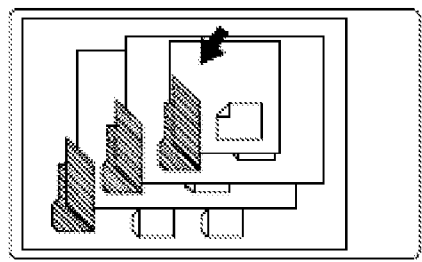
(D)
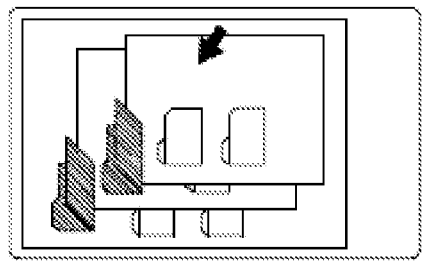
(C)
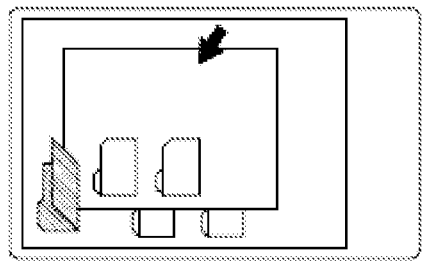
(B)
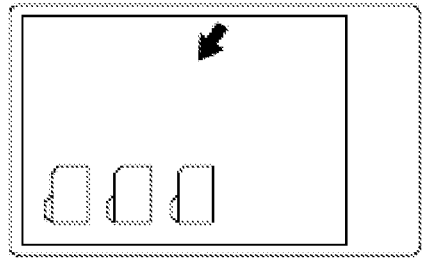
(A)
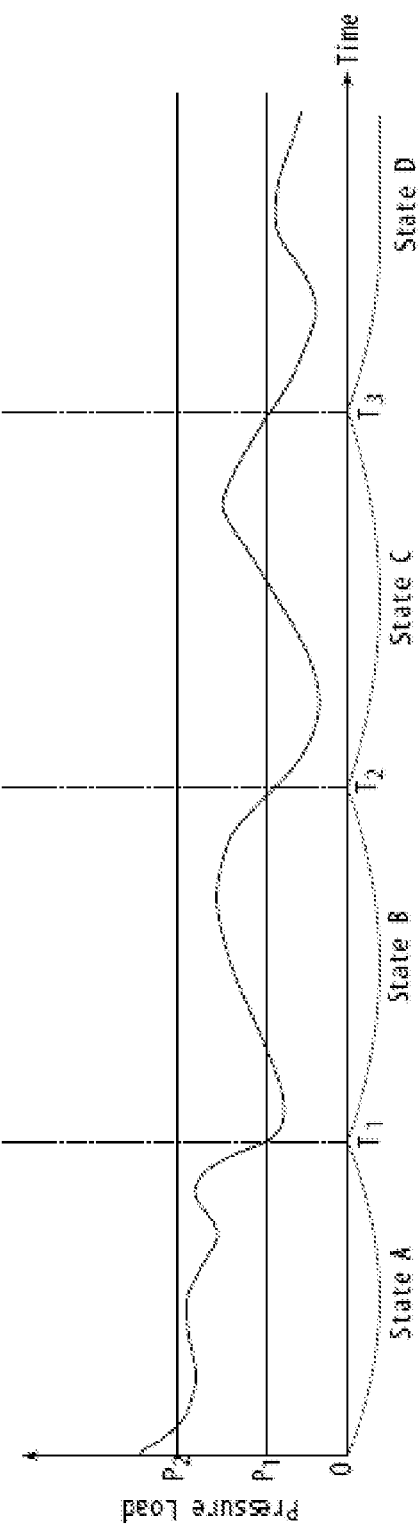

FIG. 13
Prior Art
(A)
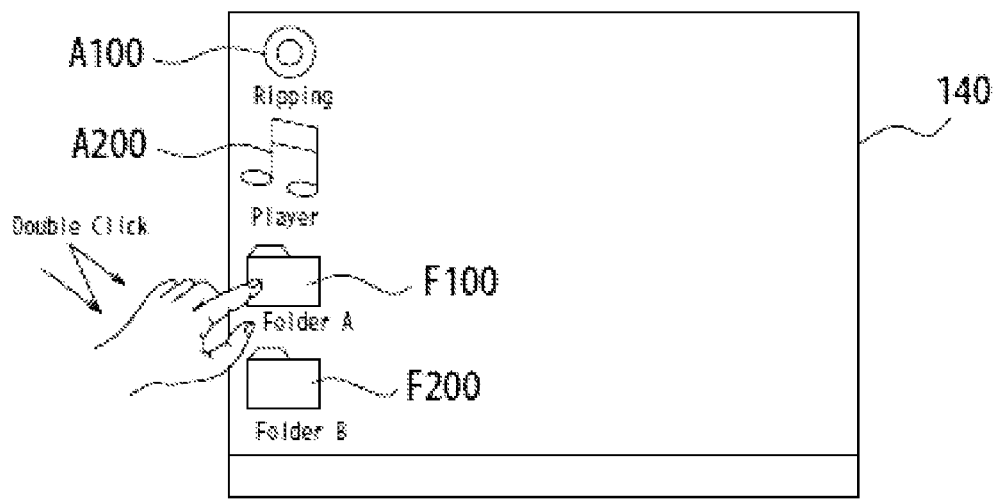
(B)
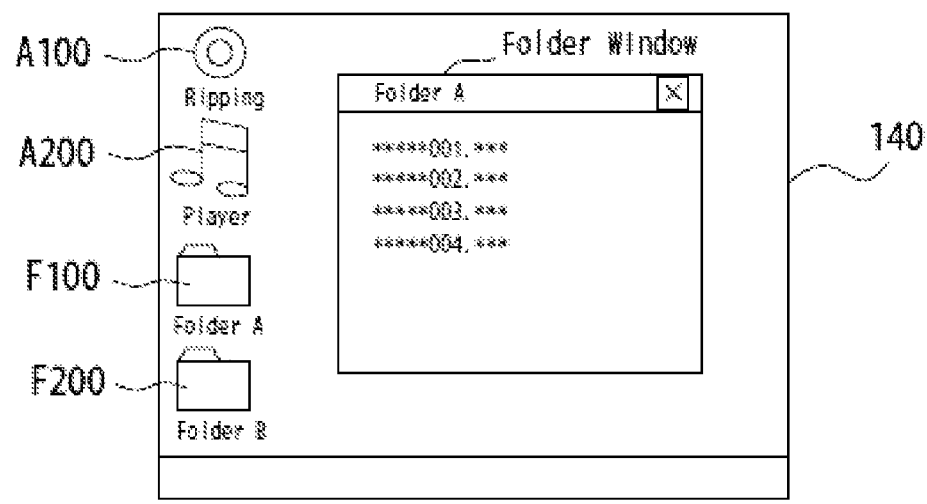

INPUT APPARATUS

CROSS REFERENCE TO RELATED APPLICATION

This application claims priority to and the benefit of Japanese Patent Application No. 2009-106835 filed on Apr. 24, 2009, the entire contents of which are incorporated herein by reference.

TECHNICAL FIELD

The present invention relates to input apparatuses, and more particularly, to input apparatuses having touch panels.

BACKGROUND ART

For mobile terminals such as mobile phones, for example, input apparatuses allowing users to operate the terminals have been developed in a variety of manners according to functions and usages of each of the terminals. In general, the input apparatuses are configured such that a user performs an input operation by directly pressing down mechanical keys or buttons, prearranged on a surface of a body of the mobile terminal, with a finger or the like.

Such mechanical keys (for example, a numerical keypad) of the input apparatus of the terminal are normally prearranged to suit a main usage of the terminal. Accordingly, physical arrangement of such keys cannot generally be changed afterward.

Incidentally, a variety of functions are incorporated in small mobile terminals, such as a digital camera function and a music player function incorporated in small mobile terminals. While the mobile phones have numerous supplementary functions incorporated therein in addition to a function for a main usage of the terminal, PDAs (Personal Digital Assistant: mobile information terminal), as single terminals, have a plurality of main usages such as schedule management, an address book and the like. If the keys of such terminals are fixedly arranged, it may inconvenience users significantly in input operation using some functions.

In order to resolve such inconvenience, there is disclosed an input apparatus having a touch panel constituted of a transparent input unit arranged on top of a liquid crystal display, which is a display unit (for example, see Patent Document 1). The input apparatus having such a touch panel generally displays graphical images of operation keys or buttons and letter(s) or a string of letters for allowing inputs (hereinafter, referred to as "objects") on a display screen of the touch panel. When a user presses the object displayed on the display screen, an input unit at a corresponding position on the touch panel receives the input.

A mobile phone described in the above Patent Document 1 allows free arrangement of the keys and can display objects arranged in a desired manner on the display screen of the touch panel in order to receive the input operation by the user. Accordingly, this mobile phone may provide an excellent operability by changing the arrangement of the objects as desired to suit the functions when each function of the terminal is selected. For example, when the user uses the digital camera function incorporated in the mobile phone, the mobile phone may display objects constituting an operation unit of a digital camera on the touch panel to receive an input operation. Moreover, when the user inputs characters in messages with the mobile phone, the mobile phone may display an object constituting a keyboard similar to that of a personal computer (PC) on the touch panel to receive inputs. In this way, having the touch panel, this mobile phone can optimize a single input apparatus to suit each of a plurality of functions and receive the input operation.

In addition, since the input apparatus having the touch panel receives an input in the form of a user's direct contact (touch) with a fingertip to the object displayed on the display unit, the user can operate it highly intuitively. That is, the user operates the input apparatus by directly touching the object displayed on the screen with a fingertip or the like, following guidance displayed on the screen of the touch panel. Accordingly, the user can operate the terminal extremely easily by an intuitive operation, following the guidance displayed on the screen, which offers an effect to reduce erroneous operations as a result.

As described above, since the touch panel enhances configuration flexibility of the input unit and advantageously allows the user to highly instinctively perform the input operation, the number of the terminal apparatuses having the input apparatuses with the touch panels has been increased.

The input apparatuses having the touch panels as described above are commonly used for not only the mobile terminals but also, for example, ATMs (Automatic Teller Machines) of banks and ticket vending machines at train stations or the like. Moreover, in shops such as fast-food shops, a terminal apparatus with the input apparatus having the touch panel as stated above is used by a clerk to process orders from customers. Application of the touch panel to the input apparatus eliminates the necessity for the mechanical buttons or keys such as the keyboard. Accordingly, since only a small area on the body of the terminal apparatus is required to arrange mechanical buttons and the like thereon, it enables downsizing of overall terminal apparatus. It thus enhances flexibility in selection of spots for installing the terminal apparatuses in the shops and the train stations.

In addition, the input operations to a personal computer (PC) can be also performed through a display unit having a touch panel. In general, the input operations to the PC differ between application programs used (hereinafter, referred to as an "application", simply). With recent development of GUI (Graphical User Interface), however, many of those applications are contrived to allow for instinctive operations. In addition, by a demand for instinctive operation, there are many common operations of files or folders performed on a desktop displayed on the display unit even between different applications. Accordingly, while the input operations to the PC used to be performed mainly with input devices, such as a key board and a mouse, a user can highly instinctively perform such input operations using the display unit with the touch panel (for example, Patent Document 2).

FIG. 12 is a diagram schematically illustrating a configuration of a data transfer system which includes an information processing apparatus described in Patent Document 2. In FIG. 12, a data transfer system 100 includes a data storage and playback apparatus 110 and a portable data storage and playback apparatus (portable storage and playback apparatus) 120. The data storage and playback apparatus 110 has a function to store and to play data (for example, music data), and the portable storage and playback apparatus 120 also has the function to store and to play music data. The data storage and playback apparatus 110 and the portable storage and playback apparatus 120 are communicably coupled to each other via a communication cable 130.

The data storage and playback apparatus 110 can store music data ripped from a CD or downloaded from a music distribution server (not shown) via a network NT. By performing operation on a display unit 140 with the touch panel, the user can transfer the music data stored in the data storage and playback apparatus 110 to the portable storage and playback apparatus 120. Accordingly, the portable storage and playback apparatus 120 can play the music data even after disconnected from the communication cable 130, as it stores the music data transferred.

FIG. 13 shows diagrams schematically illustrating that a user operates a folder on the display unit 140 with the touch panel of the data storage and playback apparatus 110. As shown in FIG. 13(A), the display unit 140 with the touch panel displays objects (icons) A100 and A200 for activating applications. By directly contacting (touching) these icons with a fingertip or the like, the user activates corresponding applications. Such an activation operation may be performed by a quick two-time touching (two touches) to an icon on the display unit 140 with the touch panel, which corresponds to double click with an input device such as the mouse. Alternatively, the operation may be performed by a one-time touching (one touch) to the icons on the display unit 140 with the touch panel, which corresponds to a single click with the input device such as the mouse.

In addition, on the display unit 140 with the touch panel, an icon F100 and an icon F200, representing a folder A and a folder B, respectively, are displayed. These folders A, B can include a plurality of files and/or subfolders in each of them in conformity with a conventional hierarchical directory structure. To the folder A or the folder B, the user can operate in a manner corresponding to conventional folder operation methods used for conventional PCs.

For example, in response to the two-touch (or one-touch) to the icon F100 representing the folder A by the user, the data storage and playback apparatus 110 can display the files included in the folder A (hereinafter, referred to as to "open" a folder), as shown in FIG. 13(B). FIG. 13(B) shows an example that filenames of four files included in the folder A are displayed in a folder window as the folder A is opened. If the folder A includes a subfolder, the data storage and playback apparatus 110, in response to the two-touch (or one-touch) to the subfolder by the user, can display a file and/or another subfolder included in the subfolder (such an operation is also referred to as to "open" the folder, hereinafter). In FIG. 13(B), the folder window is displayed showing the files included in the folder A.

In using an input apparatus such as the display unit 140 with the touch panel of the data storage and playback apparatus 110, the user must touch an object (icon) for a closing operation in order to close the folder window showing files included in a folder. In the example shown in FIG. 13(B), the user can close the folder window (hereinafter, referred to as to "close" the folder) by touching a cross mark icon displayed at upper right of the folder window. In addition, when a file or the like included in a folder is displayed, in order to move to one higher level in a hierarchical directory structure (such an operation also is referred to as to "close" the folder, hereinafter), a user must touch an icon of "return", for example.

Such an icon the user must touch to close a folder is generally located at a different position from the icon for the operation to display a file or the like included in the folder. Therefore, in order to perform the touch operation to close a folder, the user must touch a position remote from a position the user has touched to open the folder at times, which may be cumbersome.

However, if the icon to be touched to close the folder is displayed close to the icon for opening the folder in order to solve the above problem, for example, it may incur an erroneous operation by the user closing the folder despite his/her intention to open it.

It is considered that, in the folder operation using a large touch panel, such an erroneous operation as described above can be reduced by avoiding displaying the icon for opening the folder and the icon for closing the folder close to one another. In this case, however, the user must move largely in the folder operation, which is burdensome or stressful for the user. In contrast, for the folder operation with a small touch panel such as the mobile terminal, the icon for opening and the icon for closing the folder have to be displayed relatively close to one another due to a limitation of a dimension of the touch panel. In this case, therefore, there is a large possibility of the erroneous operation described above.

In order to address the above problem, an input apparatus as follows can be considered to allow for a simple, quick and reliable folder operation. The following is a description of a mobile phone having an input apparatus disclosed in a patent application (Japanese Patent Application No. 2009-17322), filed by the applicant in Japan.

FIG. 1 is an external perspective view illustrating a schematic configuration of a mobile phone 10 having an input apparatus capable of performing the folder operation in a simple, quick and reliable manner. The mobile phone 10 has a display unit 32 on the front side of a terminal body as shown by a notch, for displaying a variety of information and graphical images of keys, buttons and the like arranged on a liquid crystal display (LCD), an organic EL display or the like. The mobile phone 10 also has an input unit 34 constituted of a matrix switch or the like for receiving an input by a user with the finger or a stylus on the front surface of the display unit 32. A touch panel 30 of the mobile phone 10 includes the display unit 32 and the input unit 34. The mobile phone 10 further includes an audio input unit 70 constituted of a microphone or the like, an audio output unit 80 constituted of a speaker or the like, and a key input unit 90 constituted of at least one mechanical key.

FIG. 2 is a functional block diagram illustrating a schematic internal configuration of the mobile phone 10. As shown in FIG. 2, the mobile phone 10 has a control unit 20, the touch panel 30, a load detection unit 40, a vibration unit 50, a memory unit 60, the audio input unit 70, the audio output unit 80 and the key input unit 90. The control unit 20 controls and manages an overall mobile terminal 10 including each functional block thereof. As stated above, the touch panel 30 has the input unit 34 for receiving inputs by the user, arranged on the front side of the display unit 32 in an overlapping manner. In this way, the touch panel 30 receives the input operation by the user as well as displaying a variety of information such as a result of the input according to each application.

The input unit 34 of the touch panel 30, upon detection (reception) of the input by a touch (pressure) of a user's finger or a stylus, outputs a signal corresponding a position where the input by the touch is detected. The touch panel 30 may be of a known type such as resistive type, capacitive type or the like, for example. The display unit 32 performs display corresponding to each application, as well as displaying in a predetermined display area the graphical image of the user interface composed of various keys and buttons for receiving the input operation to the input unit 34 by the user. The display unit 32 also displays icons of folders and files described below. In the present application, hereinafter, the graphical images of various keys, buttons, icons of folders and files and the likes displayed on the display unit 32 for receiving the input operation to the input unit 34 of the touch panel 30 by the user are simply referred to as "objects."

The load detection unit 40 may be a strain gauge sensor, for example, and detects a pressure load on the touch panel 30

(especially on the input unit 34). The vibration unit 50 may be, for example, a piezoelectric transducer or an ultrasonic transducer and vibrates the touch panel 30. A constitutional relationship among the load detection unit 40, the vibration until 50 and the touch panel 30 will be described below.

The memory unit 60 stores various applications and input information, as well as serving as a work memory. In addition, the memory unit 60 also stores a plurality of templates including various objects used according to each application.

The audio input unit 70 converts user's voice and the like into input signals and provides them to the control unit 20. The audio output unit 80 converts the voice signals provided from the control unit 20 into voice and outputs it. The key input unit 90 sends a corresponding signal to the control unit 20 in response to the input operation by the user. Uses and functions of the variety of keys constituting the key input unit 90 are defined according to an application to be used.

Next, the constitutional relationship among the load detection unit 40, the vibration unit 50 and the touch panel 30 will be described.

FIG. 3 is a diagram illustrating an example of mounting structure of the touch panel 30, the load detection unit 40 and the vibration unit 50 of the mobile phone 10 shown in FIG. 2. FIG. 3(A) is a cross-sectional view of a main section, whereas FIG. 3(B) is a plain view of the main section.

The display unit 32 for displaying various objects on the touch panel 30 is contained in a housing 12. In the input apparatus of the mobile phone 10, the input unit 34 is supported on the display unit 32 via insulators 36 made of an elastic member. The display unit 32 and the input unit 34 of the input apparatus are rectangular in a planar view. Although the touch panel 30 is square in FIG. 3, the touch panel 30 may be oblong to suite a specification of the mobile terminal mounting the touch panel 30. In this input apparatus, the input unit 34 is supported on the display unit 32 via the insulators 36 arranged at four corners outside a display area A of the display unit 32 indicated by virtual lines in FIG. 3(B).

In addition, the housing 12 of the input apparatus is provided with an upper cover 14 for covering a surface area of the input unit 34 outside the display area of the display unit 32. Insulators 16 made of elastic members are arranged between the upper cover 14 and the input unit 34.

The input unit 34 has a front face, that is, a plane for receiving input operations formed of a transparent film, and a rear face formed of a glass. The input unit 34 may be designed such that when the operation face is pressed down, the transparent film on the front face is bent (strained) slightly in accordance with the pressure.

In addition, in this input apparatus, the strain gauge sensor for detecting the pressure load (pressure) applied on the input unit 34 is provided, being adhered or the like, on the transparent film of the front face of the input unit 34 near each side covered by the upper cover 14. Moreover, in the input apparatus, a piezoelectric element or an ultrasound transducer for vibrating the input unit 34 is provided, being adhered or the like, on the glass of the rear side of the input unit 34 near each of two opposed sides. That is, in the input apparatus shown in FIG. 3, the load detection unit 40 and the vibration unit 50 shown in FIG. 2 employ four strain gauge sensors and two transducers, respectively. By generating vibration, the vibration unit 50 can supply the vibration to a pressing object, such as the user's finger or the stylus pressing the input unit 34. Additionally, the vibration unit 50 drives, for example, two ultrasound transducers in phase. It is to be noted that the housing 12, the upper cover 14 and the insulator 16 shown in FIG. 3(A) are omitted in FIG. 3(B).

In this input apparatus, the control unit 20 monitors a location of an input detected by the input unit 34 and a pressure load detected by the load detection unit 40. The control unit 20 can determine whether the pressure load detected by the load detection unit 40 satisfies a predetermined load standard (standard value). The load detection unit 40 detects the load from, for example, an average output value of the four strain gauge sensors.

Here, the "predetermined load standard" is a standard of the pressure load detected by the load detection unit 40 in performing an opening processing or a closing processing of the folder, which will be described below. The predetermined load standard may be set at the time of initial setting of the mobile phone 10 or by changing the setting by the user. The load detection unit 40 is also capable of detecting a pressure load on the input unit 34 changing from a state not satisfying the predetermined load standard to a state satisfying it, by monitoring a temporal change in the pressure load. Similarly, by monitoring the temporal change in the pressure load, the load detection unit 40 can detect a pressure load on the input unit 34 changing from the state satisfying the predetermined load standard to the state not satisfying it.

Next, the opening operation and the closing operation of the folder carried out by the input apparatus of the mobile phone 10 will be described. FIG. 4 is a conceptual diagram illustrating the opening operation and the closing operation of the folder by the input apparatus. This input apparatus uses folders in conformity with a concept of the hierarchical directory structure widely used by basic software, such as conventional operating systems (OS). Accordingly, each folder used by this input apparatus can include a plurality of files and/or subfolders.

In the present application, it is referred to as to "open" a folder/file to display contents (objects) of files and/or subfolders included in a folder in order to show the contents of the folder to the user. For example, if a folder A shown in FIG. 4(A) includes a folder B, a folder C, a file a and a file b, contents of the folder A are displayed as shown in FIG. 4(B) when the folder A is opened. In addition, if the folder B shown in FIG. 4(B) includes a folder D and a file c, contents of the folder B are displayed as shown in FIG. 4(C) when the folder B is opened.

In the present application, further, it is referred to as to "close" a folder to return to hide contents thereof from a state of the folder opened showing the contents. For example, although contents of the folder B (the folder D and the file c) are displayed in FIG. 4(C), the display is changed to FIG. 4(B) when the folder B is closed. In addition, although the contents of the folder A (the folder B, the folder C, the file a and the file b) are displayed in FIG. 4(B), for example, the display is changed to FIG. 4(A) when the folder A is closed.

Next, detection of the pressure load on the touch panel 30 of the mobile phone 10 will be described.

The mobile phone 10 can display objects of folders arranged in the hierarchical structure as shown in FIG. 4 on the display unit 32 of the touch panel 30. At this time, the input unit 34 of the touch panel 30 receives a pressing input to the display unit 32 by a user's fingertip or a stylus. In response to the pressing input to the input unit 34, the load detection unit 40 detects the pressure load on the input unit 34.

FIG. 5 is a diagram illustrating an example of the pressure load on the input unit 34 by the user's finger or the stylus detected by the load detection unit 40. FIG. 5 schematically illustrates an example of temporal change in the pressure load detected by the load detection unit 40 when the user performs the input operation by pressing the input unit 34 of the touch panel 30. In performing operation (pressing input) to press the input unit 34 of the touch panel 30, the user generally continues to increase the pressure on the input unit 34 (that is, presses the input unit 34 down) after touching the input unit 34 until determining that the input is received. In addition, upon determination that the input is received, the user reduces the pressure on the input unit 34 (that is, removes the finger or the like from the input unit 34). Accordingly, as represented by a curved line shown in FIG. 5, the pressure load detected by the load detection unit 40 is first increased upward to the right and then reduced downward to the right with time passing from the left to the right.

In performing a normal input operation to the input unit 34 by the user, the pressing input has the normal pressure. Therefore, the load detection unit 40 detects the pressure load varying via A1 and A2 shown in FIG. 5, for example. When a user performs a pressing input with the pressure higher than that of the normal input operation to the input unit 34, the pressing input with the pressure higher than the normal pressure is performed intentionally, and thus the load detection unit 40 detects the pressure load varying via B1 and B2 shown in FIG. 5, for example.

As described above, the mobile phone 10, by using the load detection unit 40, can distinctively detect a load standard (P1 in FIG. 5, for example) for the normal input operation with a normal pressure and a load standard (for example, P2) for the input operation with a pressure higher than that of the normal input operation. In addition, setting the load standard such as P1 shown in FIG. 5, for example, allows for distinction between the pressing input changing from the state not satisfying the load standard to the state satisfying it (A1 shown in FIG. 5) and the pressing input changing from the state satisfying the load standard to the state not satisfying it (A2 shown in FIG. 5). Accordingly, the mobile phone 10 can distinguish these two inputs and assign respective processing or operations thereto.

FIG. 6 is a flowchart illustrating the opening processing and the closing processing of the folder by the input apparatus of the mobile phone 10. For this input apparatus, a first load standard and a second load standard are set as pressure load standards for the opening operation and the closing operation of the folder. Here, the second load standard is set lower than the first load standard.

The processing start upon detection of the pressing input to the input unit 34 of the touch panel 30 by the user's finger or the like. It is assumed that a folder object is displayed on the display unit 32 at the start of the processing. When the input to the input unit 34 is detected in response to the pressing input to the input unit 34 at a position corresponding to a position of an object of the folder, the control unit 20 determines whether the load detection unit 40 has detected the pressure load changing from a state not satisfying the first load standard to a state satisfying it (step S31). In the flowchart of FIG. 6, "under→equal to or over the standard" represents "from a state not satisfying the standard to a state satisfying it", for the sake of simplicity. Likewise, "equal to or over→under the standard" represents "from a state satisfying the standard to a state not satisfying it."

At step S31, if the load detection unit 40 detects the pressure load changing from the state not satisfying the first load standard to the state satisfying it, the control unit 20 opens the folder (step S32). That is, the control unit 20 displays an icon (object) of a file and/or subfolder on one level below the folder to be open on the display unit 32. After opening the folder at step S32, the control unit 20 determines whether the load detection unit 40 has detected the pressure load changing from a state satisfying the second load standard, lower than the first load standard, to a state not satisfying it (step S33).

If the load detection unit 40 does not detect the pressure load changing from the state satisfying the second load standard, lower than the first load standard, to the state not satisfying it at step S33, the control unit 20 returns to step S31 to continue the processing. At this point, if a subfolder included in the open folder is displayed on the display unit 32, the input apparatus can receive an input by the user moving an input position to an object of the subfolder while the pressure load on the input unit 34 is being detected. In this case, if the pressure load changing from the state not satisfying the first load standard to the state satisfying it is detected at a position on the input unit 34 corresponding to the position of the object of the subfolder at step S31, the control unit 20 opens the subfolder at step S32. Capable of repeating such processing, this input apparatus allows the user to open subfolders on lower levels of a folder in a descending order.

FIG. 7 is a diagram illustrating a specific example of the processing based on repetitive opening processing of the folders described above. FIG. 7 shows, in performing the processing described above, the temporal change in the pressure load to the input unit 34 of the touch panel 30 detected by the load detection unit 40 in a lower half, and a transition of the display of the display unit 32 associated with the temporal change in an upper half. In FIG. 7, the first load standard in the processing described above is represented by a "load standard P2", whereas the second load standard is represented by a "load standard P1."

FIG. 7(A) shows a state that the user gradually increases the pressure of a pressing input after touching the input unit 34 of the touch panel 30 with the finger or the like. In FIG. 7(A), a hatched object represents a folder corresponding to a position on the input unit 34 where the input is detected. When there is an object such as a folder or a file at the position on the input unit 34 where the input is detected as described above, the control unit 20, for example, colors the object in order to show the user that the input to the object is being detected. In FIG. 7(A), an arrow provided to the hatched folder indicates the input position where the input by the user's finger or the like is detected. It is possible to set either to display or hide such an object indicating the input position.

In FIG. 7(A), the user is pressing the folder at the upper left on the input unit 34 of the touch panel 30. If the pressure load on the input unit 34 changes from a state not satisfying the first load standard P2 to a state satisfying it while the user is pressing the folder (Yes of step S31), the control unit 20 opens the folder being pressed, as shown in FIG. 7(B) (step S32). It is assumed that the user then moves the position of the pressing input to a subfolder included in the open folder while pressing the input unit 34, pressing a position of the subfolder indicated by an arrow in FIG. 7(B) as a result. In this state, if the pressure load on the input unit 34 by the user changes from the state not satisfying the first load standard P2 to the state satisfying it again (Yes of step S31), the control unit 20 opens the subfolder being pressed, as shown in FIG. 7(C) (Step S32). By a similar operation, the user can subsequently open a folder in FIG. 7(C), as shown in FIG. 7(D).

It is also possible to select or execute a subfolder or a file included in the open folder in the states shown as FIG. 7(C) or (D), for example. In this case, the input apparatus receives an input moving the input position on the input unit 34 to an object of a folder or a file desired by the user while the pressure load satisfying the load standard P2 is maintained. After detection of the input moving the input position to the object of the subfolder or the file included in the open folder, the load detection unit 40 of the input apparatus receives the input to the object satisfying a pressure load set to be higher than the load standard P2. Upon detection of the input to the object satisfying the load standard higher than the load standard P2, the control unit 20 selects or executes the subfolder or the file associated with the object.

Meanwhile, if a pressure load changing from the state satisfying the second load standard, which is lower than the first load standard, to the state not satisfying it is detected at step S33, the control unit 20 controls to close the open folder on the display unit 32 (step S34). In this case, the control unit 20 controls to close the lowest folder among the open folders on the display unit 32. After step S34, the control unit 20 determines whether a pressing input to the input unit 34 is detected (step S35). The control unit 20 returns to step S31 to continue the processing if the pressing input is detected, otherwise ends the processing. As described above, since the mobile phone 10 allows the user to repeat the closing operation of the folder without removing the finger from the input unit 34 of the touch panel 30, the user can sequentially close the lowest folder to return to one higher-level folder. This input apparatus can receive the input with a pressure load changing from the state satisfying the load standard P1 to the state not satisfying it for closing the folder, either at the position of the object of the open folder or elsewhere.

FIG. 8 shows diagrams illustrating a specific example of the processing based on the repetitive closing processing of the folder described above. In FIG. 8 also, the second load standard described in the above processing is represented by the "load standard P1", whereas the first load standard is represented by the "load standard P2."

In FIG. 8(A), the display unit 32 displays three open folders. That is, contents of a first-level folder to a third-level folder are displayed in FIG. 8(A). At this point, if the pressure load on the input unit 34 of the touch panel 30 by the user changes from the state satisfying the second load standard P1 to the state not satisfying it (Yes of step S33), the control unit 20 closes the lowest (third-level) folder as shown in FIG. 8(B) (step S34). Then, if the pressure load on the input unit 34 changes from the state satisfying the second load standard P1 to the state not satisfying it again (Yes of step S33), the control unit 20 closes the lowest (second-level) folder, as shown in FIG. 8(C) (step S34). By a similar operation, the user can close a folder in FIG. 8(C), as shown in FIG. 8(D).

Accordingly, the mobile phone 10 eliminates the need to separately provide an icon specifically for closing a folder. In addition, the mobile phone 10 allows the user to open and close the folder by a simple and distinguishable operation. This input apparatus, therefore, enables simple, quick and reliable folder operations using the touch panel.

In addition, this input apparatus allows the user to continuously open and close folders by a sequence of smooth operations without removing the finger from the input unit 34 of the touch panel 30. It is to be noted that, upon detection of the pressure load on the input unit 34 changing from the state not satisfying the first load standard P2 to the state satisfying it at a position corresponding to an object of not a folder but a file, the control unit 20 performs processing to activate an application to open the file. Further, when the user closes a folder, this input apparatus can receive an input with the pressure load, changing from the state satisfying the second load standard P1 to the state not satisfying it, at any position of the input unit 34.

PRIOR ART DOCUMENTS

Patent Documents

Patent Document 1: JP 2006-311224 A
Patent Document 2: JP 2008-250924 A

SUMMARY OF INVENTION

Technical Problem

The input apparatus described above allows a user to perform a simple, quick and reliable folder operation using the touch panel. In addition, this input apparatus also allows the user to close folders continuously in a simple manner. According to this input apparatus, that is, the user can sequentially close subfolders included in an open folder in an easy and quick manner.

However, if the pressure of the input by the user fluctuates during continuous closing operations of the folders using this input apparatus, it may cause an operation unintended by the user.

That is, in a state B shown in FIG. 8(B), after closing a folder, the user intends to close one higher-level folder including the folder. At this time, by increasing the pressure once and then reducing it such that the pressure load satisfies the second load standard P1 and then fails to satisfy it, the user can close one higher-level folder as well, as shown in a state C in FIG. 8(C).

However, when the user increases the pressure in the state B in FIG. 8(B), for example, the pressure load may further satisfy the first load standard P2 after satisfying the second load standard P1. If the user is pressing a position of an object of a folder when the pressure load further satisfies the first load standard P2 as described above, the input apparatus opens the folder being pressed in response to such a pressing input. Although this is a normal processing of the input apparatus as per a prescribed procedure, the user regards that an intended operation is not received by the input apparatus.

Especially in the continuous closing operation of a plurality of folders, the user increases and reduces the pressure continuously. Therefore, intensity to continuously control the pressure may be fluctuated, increasing the pressure load much more than user's intention.

With recent reduction in prices of memory devices, such as a flash memory and the like, a memory capacity of each terminal is dramatically increased. As such, even a small terminal such as a mobile terminal, for example, is capable of storing a great number of folders and files. As the number of the files and folders stored in the terminal is increased, the hierarchical directory structure becomes more complicated, multiplying the number of levels. In order to carry out an operation to reach a desired file or folder among a number of files and folders on multiple complicated levels, the user needs to repeat the opening operations and the closing operations of the folders described above numerous times.

Therefore, if there is an erroneous input to open a folder during repetitive closing operations of the folders, it causes a great stress on the user.

Such an operation requiring subtle adjustments of the pressure as described above may be easy for users who are accustomed to it. However, for users who have never operated such an input apparatus before, elder users and disabled users, such an operation requiring subtle adjustments of the pressure are not always easy.

Accordingly, it is an object of the present invention, in consideration of such a problem, to provide an input apparatus capable of handling an erroneous operation (incorrect operation) unintended by the user.

Solution to Problem

In order to achieve the above object, an input apparatus according to a first aspect of the present invention includes:

a display unit configured to display objects of folders arranged in a hierarchical structure;

an input unit configured to receive a pressing input to the display unit;

a load detection unit configured to detect a pressure load on the input unit; and a control unit, if the load detection unit continuously detects a pressure load satisfying a first load standard for a predetermined period while the display unit is displaying an object of an open folder and the input unit is receiving a pressing input at a position corresponding to an object of another folder different from the open folder, configured to control to open the another folder.

A second aspect of the present invention is that the input apparatus according to the first aspect, wherein the control unit controls to close a lowest folder among the open folders, if the load detection unit detects a pressure load changing from a state satisfying a second load standard, lower than the first load standard, to a state not satisfying the second load standard.

Effect of the Invention

According to the input apparatus of the present invention, if the load detection unit detects a pressure load satisfying the first load standard for a predetermined period while an object of an open folder is displayed and the input unit is receiving a pressing input at a position corresponding to an object of another folder different from the open folder, the another folder is opened. Accordingly, even if a pressure load satisfying the predetermined load standard is detected at the position of the object of the another folder, the another folder is not opened, unless the detection of the pressure load lasts for the predetermined period. It thereby prevents the processing unintended by a user even if the user misadjusts the pressure of the pressing input.

BRIEF DESCRIPTION OF DRAWINGS

FIG. 3 shows diagrams illustrating an example of mounting structure of a touch panel, a load detection unit and a vibration unit of the mobile phone shown in FIG. 2;

FIG. 8 shows diagrams illustrating a specific example of repetitive closing operations of folders by the mobile phone shown in FIG. 1;

FIG. 13 is a diagram schematically illustrating an operation of a folder on a display unit with a touch panel of a data storage and playback apparatus by the user according to the conventional arts.

DESCRIPTION OF EMBODIMENT

An embodiment of the present invention will be described with reference to the accompanying drawings. The following description of embodiments assumes that a mobile terminal with an input apparatus according to the present invention is a mobile phone for example. However, the input apparatus according to the present invention is applicable not only to the mobile phone but also to any mobile terminal having a touch panel, such as a PDA, for example. Further, the present invention is applicable not only to the mobile terminal but also to any input terminal having the touch panel, such as ATM of a bank and a ticket vending machine at a train station as stated above.

Figure 1:
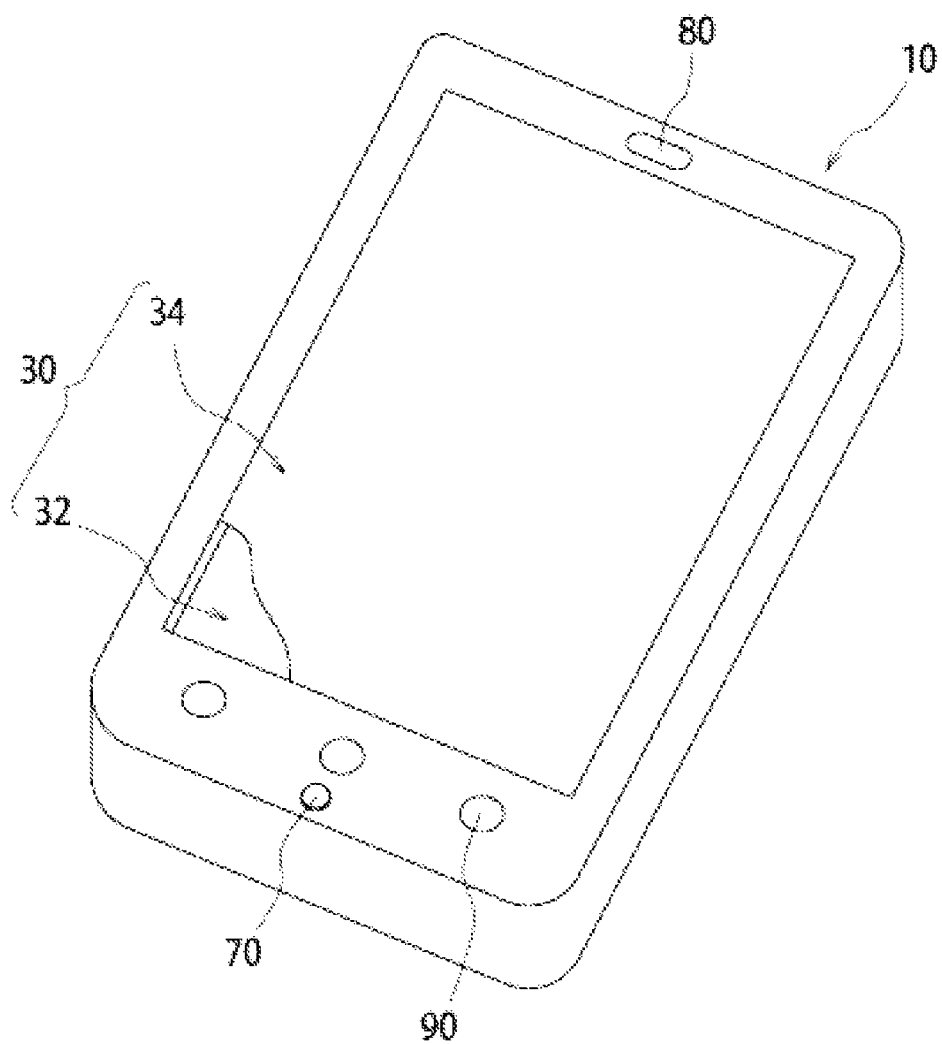
FIG. 1 is an external perspective view of a mobile phone having an input apparatus according to conventional arts.
Figure 2:
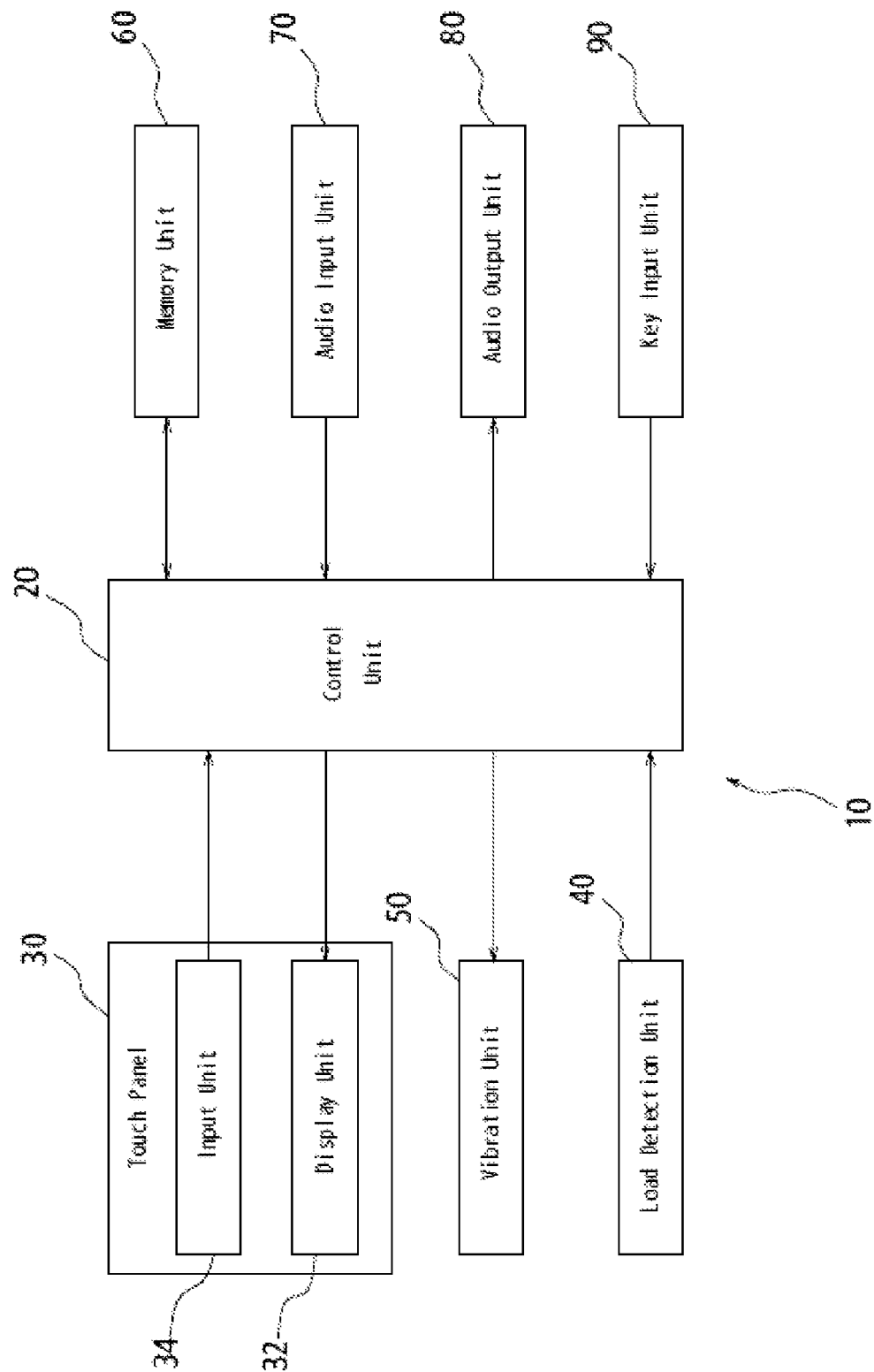
FIG. 2 is a functional block diagram illustrating an internal configuration of the mobile phone shown in FIG. 1.

The input apparatus according to the embodiment of the present invention may have almost the same configuration as a mobile phone 10 in FIG. 1 having an input apparatus described in the section of Background Art. Therefore, the same descriptions as the mobile phone 10 having the above input apparatus will be omitted appropriately.

Figure 9:
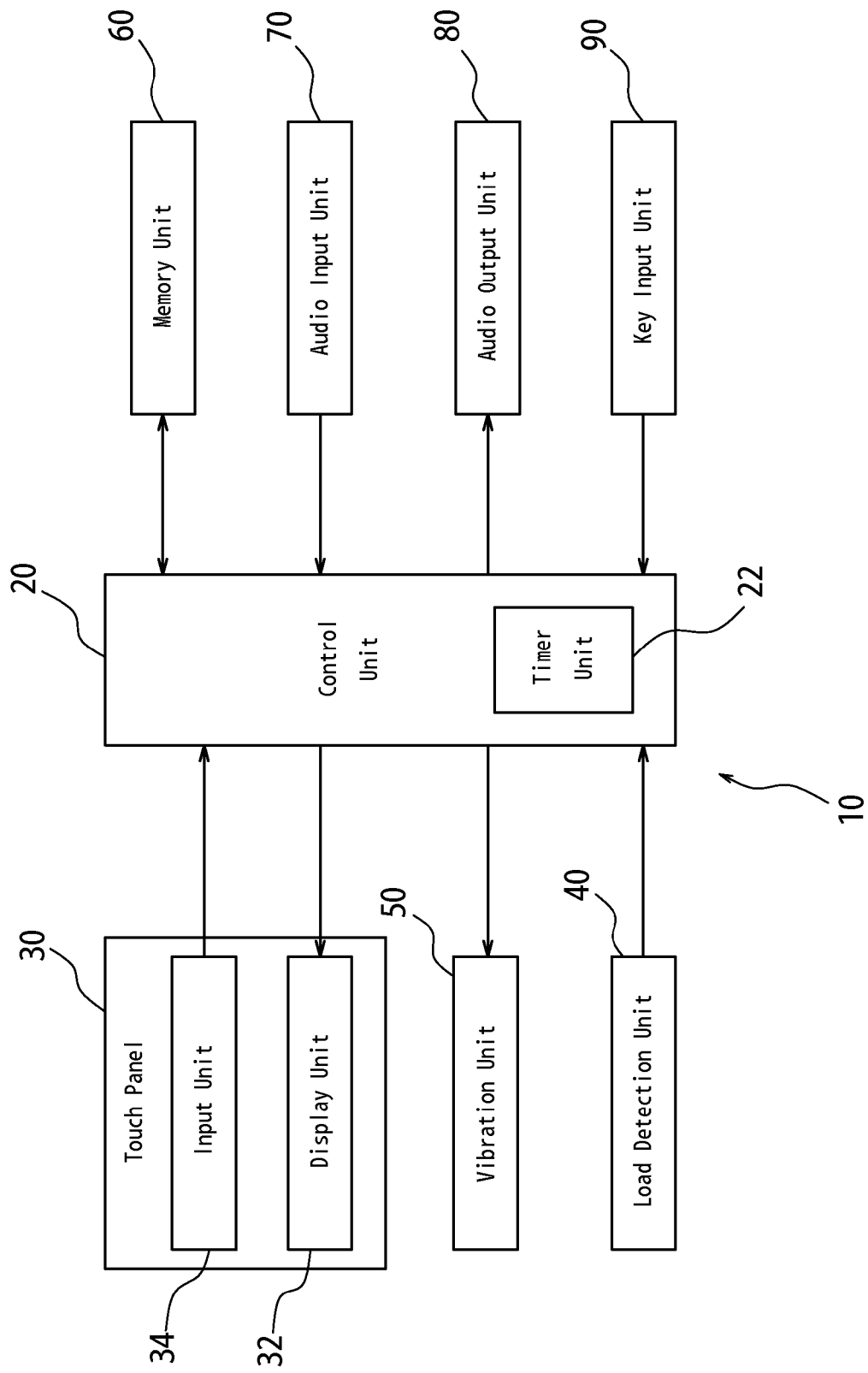
FIG. 9 is a functional block diagram illustrating a schematic internal configuration of a mobile phone according to an embodiment of the present invention.

FIG. 9 is a functional block diagram illustrating a schematic internal configuration of a mobile phone 10 according to the embodiment of the present invention. As shown in FIG. 9, the mobile phone 10, in the same manner as the above mobile phone 10 described in the section of Background Art, has a control unit 20, a touch panel 30, a load detection unit 40, a vibration unit 50, a memory unit 60, an audio input unit 70, an audio output unit 80 and a key input unit 90.

According to the present embodiment, the display unit 32 of the touch panel 30 displays objects of folders arranged in a hierarchical structure. In addition, the input unit 34 of the touch panel 30 receives (detects) a pressing input to the display unit 32 by the user. Further, the load detection unit 40 detects a pressure load on the input unit 34.

In the mobile phone 10 according to the embodiment of the present invention, the control unit 20 has a timer unit 22. The timer unit 22 may be implemented by a timer function of the control unit 20, for example, and capable of measuring the time, being triggered by various kinds of inputs. For example, if the load detection unit 40 detects a pressure load exceeding a predetermined threshold, the timer unit 22 can measure the time from a start of such detection.

Other than the configurations described above, each function unit of the mobile phone 10 according to the embodiment of the present invention may have the same configuration as the mobile phone 10 having the above input apparatus described in the section of Background Art. Hence, detailed descriptions thereof will be omitted. The touch panel 30 of the mobile phone 10 according to the embodiment of the present invention may have the same structure as that described with reference to FIG. 3.

Next, the processing to avoid an erroneous operation in opening operation and closing operation of a folder according to the embodiment of the present invention will be described.

Figure 4:
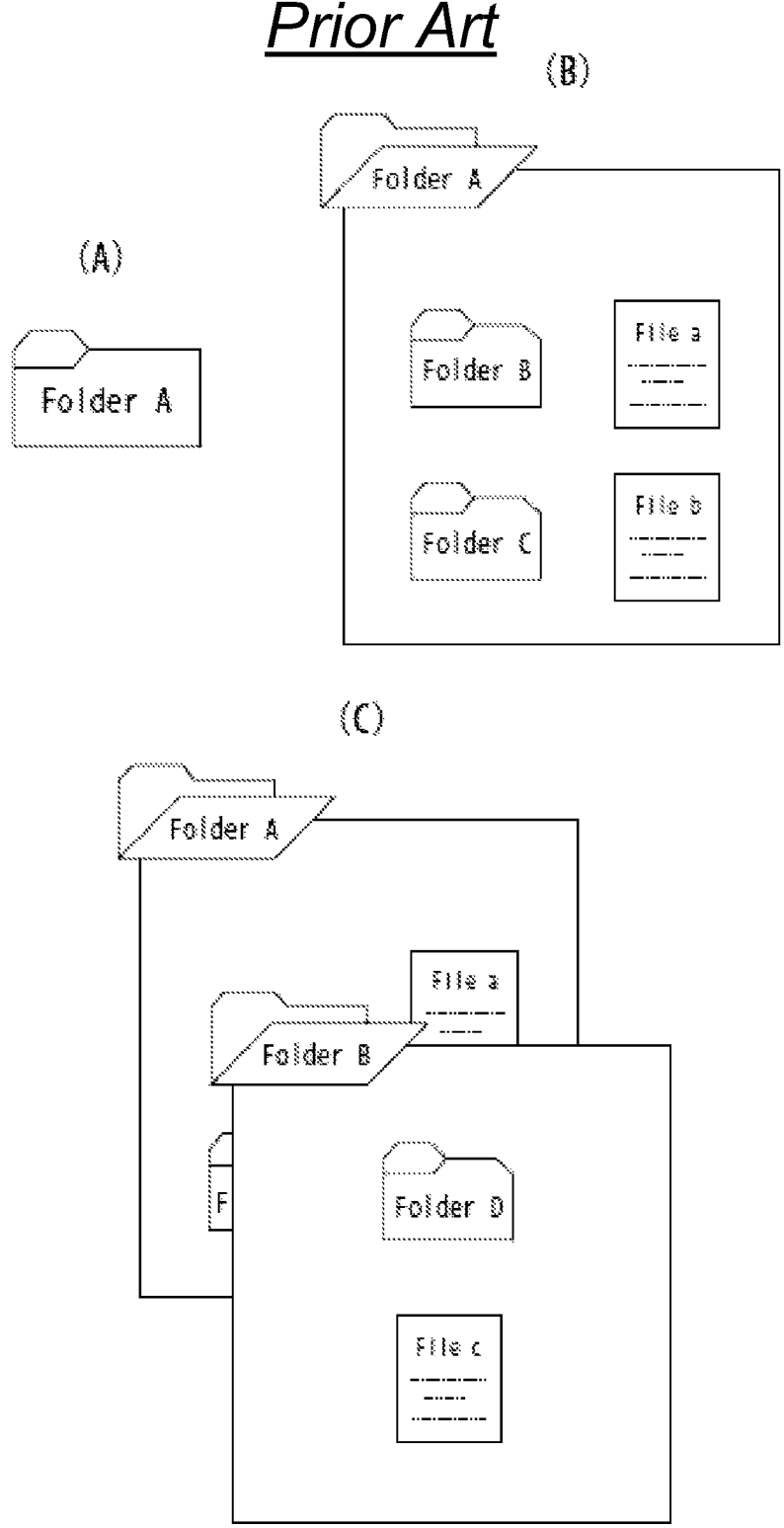
FIG. 4 shows conceptual diagrams illustrating states in an opening operation and a closing operation of folders by the mobile phone shown in FIG. 1.
Figure 5:
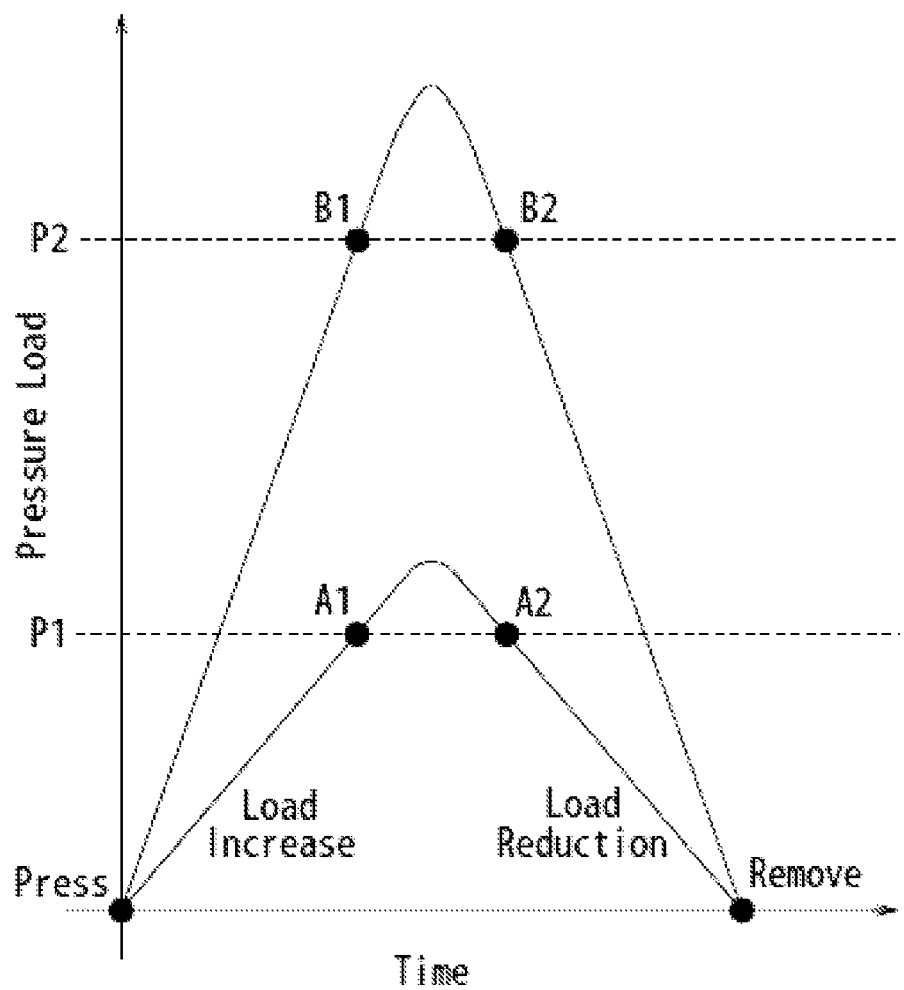
FIG. 5 is a graph schematically illustrating an example of temporal variation in a pressure load detected by the load detection unit when a user presses an input unit of the touch panel.
Figure 6:
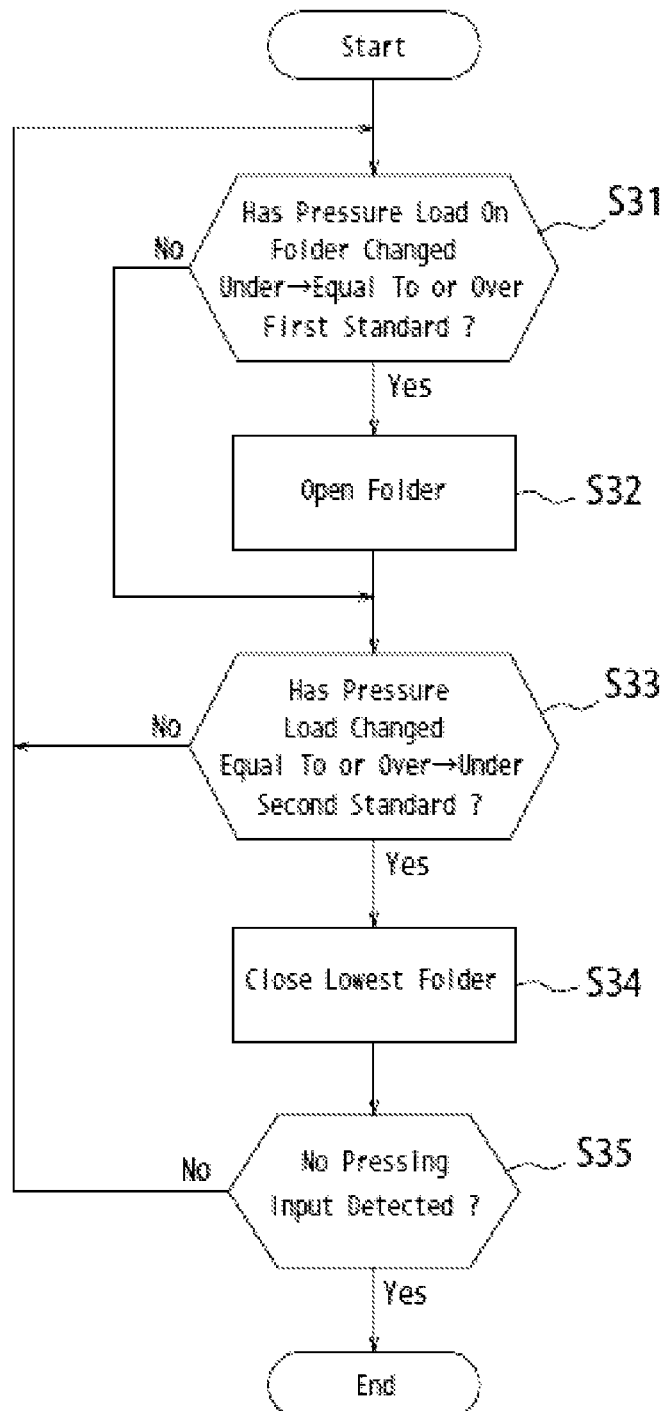
FIG. 6 is a flowchart illustrating the opening processing and the closing processing of folders by the mobile phone shown in FIG. 1.

As standards for performing the opening operation and the closing operation of the folder, a first load standard and a second load standard are set according to the present embodiment as well. In addition, the second load standard is set lower than the first load standard in the present embodiment, in the same manner as the above input apparatus. According to the present embodiment, the processing when a user performs the opening operation and the closing operation of the folder based on the concept of a hierarchical directory structure are the same as those described with reference to FIG. 4. According to the present embodiment, further, the processing for the load detection unit 40 to detect the pressure load on the touch panel 30 of the mobile phone 10 is the same as that described with reference to FIG. 5.

Figure 10:
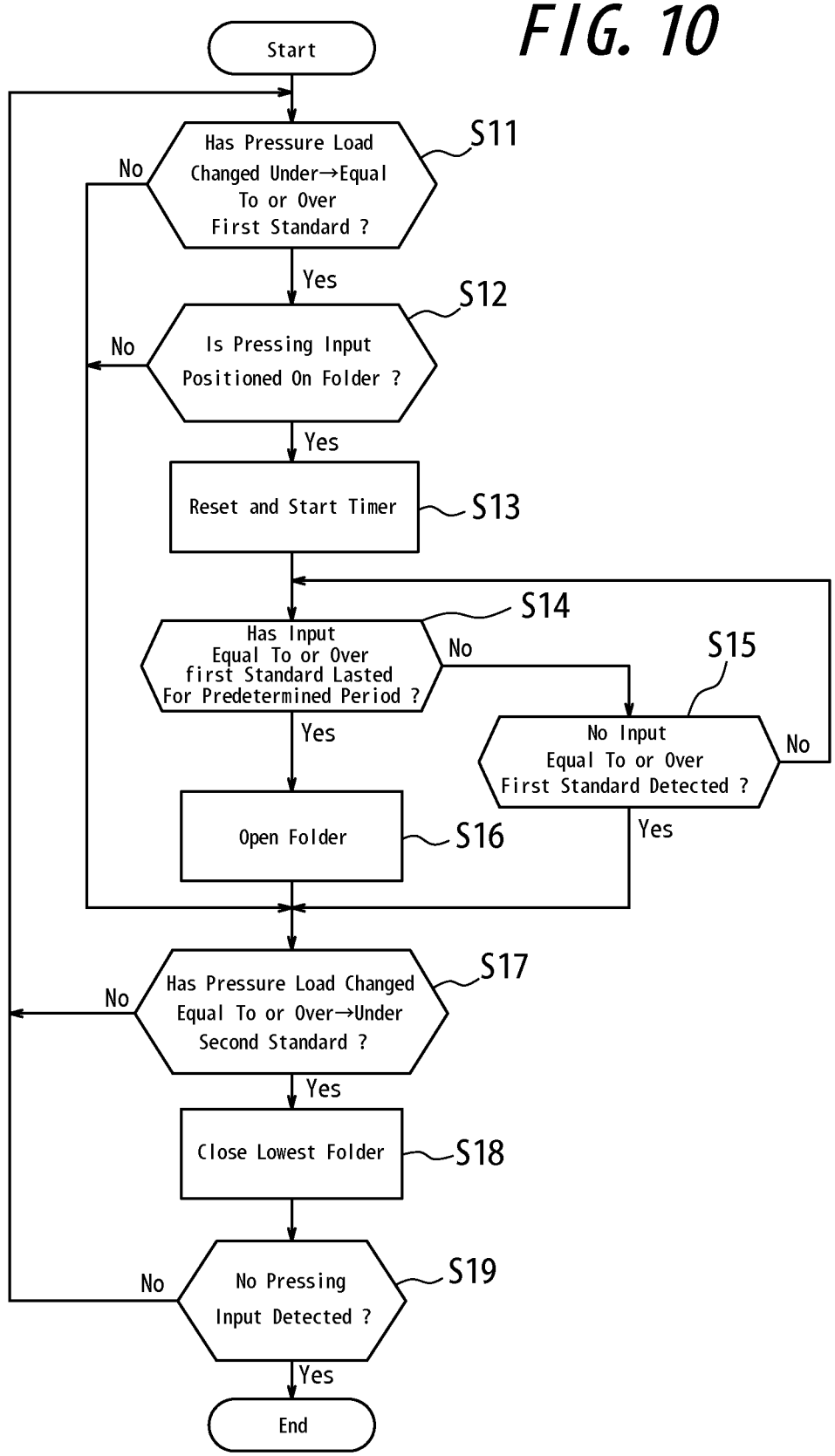
FIG. 10 is a flowchart illustrating the opening processing and closing processing of the folders according to the embodiment of the present invention.

FIG. 10 is a flowchart illustrating the processing to avoid the erroneous operation in the opening operation and the closing operation of the folder according to the present embodiment. This processing starts upon detection of the pressing input by the input unit 34 of the touch panel 30. This processing is for handling the erroneous operations unintended by the user in the closing operation of the folder. Accordingly, it is assumed that at least one object of a folder being open is displayed on the display unit 32 at a start of this operation. Upon detection of an input to the input unit 34 of the touch panel 30, the control unit 20 determines whether the load detection unit 40 has detected a pressure load changing from a state not satisfying the first load standard to a state satisfying it (step S11). In the flowchart in FIG. 10, "under→equal to or over the standard" represents "from a state not satisfying the standard to a state satisfying it", for the sake of simplicity. Likewise, "equal to or over→under the standard" represents "from a state satisfying the standard to a state not satisfying it."

If the load detection unit 40 detects the pressure load changing from the state not satisfying the first load standard to the state satisfying it at step S11, the control unit 20 shifts to step S12. At step S12, the control unit 20 determines whether a position of the pressing input on the input unit 34 by the user corresponds to a position displaying an object of a folder on the display unit 32 (step S12). Here, the "object of the folder" is an object of another folder different from the object of the folder being open and displayed on the display unit 32. In addition, since the object already opened cannot be further opened, the above "object of the folder" is an object of a folder being closed and displayed on the display unit 32.

At step S12, if the position on the input unit 34 receiving the pressing input corresponds to the position displaying the object of the folder on the display unit 32, the control unit 20 resets the timer unit 22 and then controls the timer unit 22 to measure time (step S13). In this case, the timer unit 22 measures the time that the pressure load satisfying the first load standard is being detected as triggered when the load detection unit 40 detects the pressure load satisfying the first load standard after not satisfying it.

After the timer unit 22 starts measuring the time at step S13, the control unit 20 determines whether the time measured by the timer unit 22 has reached a predetermined period (step S14). Here, the "predetermined period" is a predetermined period suitably set to prevent execution of the original processing to open a folder when a user makes unintended input with the pressure load satisfying the first load standard. The "predetermined period" may be set in advance, and preferably can be changed by a user afterward. In addition, for example, by obtaining time in normal continuous pressing inputs by the user and analyzing the data, the control unit 20 can suitably amend the "predetermined period" set in advance based on the data analyzed. In this way, the control unit 20 can set the "predetermined period" by suitably adjusting the duration thereof for both users who perform continuous pressing inputs quickly and users who perform continuous pressing inputs slowly.

If the time measured by the timer unit 22 has not reached the predetermined period at step S14, the control unit 20 determines whether the load detection unit 40 stops detecting the pressure load satisfying the first load standard (step S15). If the load detection unit 40 is still detecting the pressure load satisfying the first load standard at step S15, the control unit 20 returns to step S14 to determine whether the time measured by the timing unit 22 has reached the predetermined period.

For example, if the pressure load satisfying the first load standard is detected for a very short period (and then a pressure load not satisfying the first load standard is detected again), it is unreasonable to assume that the user is performing the opening operation of the folder by intentionally increasing the pressure. According to the present embodiment, therefore, the control unit 20 does not carry out the opening processing of the folder even if the pressure load satisfying the first load standard is detected at step S14, so long as the duration of the detection of such a pressure load is within the predetermined period. Accordingly, even if the user unintentionally performs an erroneous operation by increasing the pressure to exceed the first load standard, the folder at a position of the pressing input by the user is not opened against the user's intention, so long as the duration of such an erroneous operation is within the predetermined period.

In contrast, if the time measured by the timer unit 22 reaches the predetermined period at step S14, the control unit 20 controls to open the folder corresponding to the position where the pressing input by the user is detected (step S16). At step S16, since a position on the input unit 34 receiving the pressing input by the user corresponds to a position displaying the object of the folder on the display unit 32, the control unit 20 controls to open the folder corresponding to the position where the pressing input is detected. That is, the control unit 20 displays an icon (object) of a file and/or subfolder located one level below the folder (to be open) corresponding to the position where the pressing input is detected on the display unit 32.

If the duration of detection of the pressure load satisfying the first load standard reaches the predetermined period at step S14 as described above, it can be assumed that the user is intentionally increasing the pressure. According to the present embodiment, therefore, if the duration of the detection of the pressure load satisfying the first load standard reaches the predetermined period at step S14, the control unit 20 carries out the opening processing of the folder. Accordingly, when the user intentionally maintains the pressing input satisfying the first load standard for the predetermined period or longer, the folder is opened as intended by the user.

After opening the folder at step S16, the control unit 20 determines whether the load detection unit 40 has detected a pressure load changing from the state satisfying the second load standard, lower than the first load standard, to the state not satisfying it (step S17). The control unit 20 shifts to step S17 if a pressure load changing from the state not satisfying the first load standard to the state satisfying it is not detected at step S11 and also if the position receiving the pressing input does not correspond to the position of the folder at step S12.

If the pressure load changing from the state satisfying the second load standard, lower than the first load standard, to the state not satisfying it is not detected at step S17, the control unit 20 returns to step S11 to continue the operation. At this time, if a subfolder of the open folder is displayed on the display unit 32, the input apparatus according to the present embodiment can receive an input moving an input position to an object of the subfolder while the pressure load to the input unit 34 is being detected. At this time, if the pressure load changing from the state not satisfying the first load standard to the state satisfying it is detected at step S11, and if the input to the input unit 34 corresponds to the position of the object of the subfolder (Yes of step S12), the control unit 20 carries out processing of step S13 and thereafter. That is, if the pressure load satisfying the first load standard is detected for the predetermined period timed by the timer unit 22 or longer (Yes of step S14), the control unit 20 opens the folder corresponding to the position where the pressing input is detected (step S16).

Figure 7:
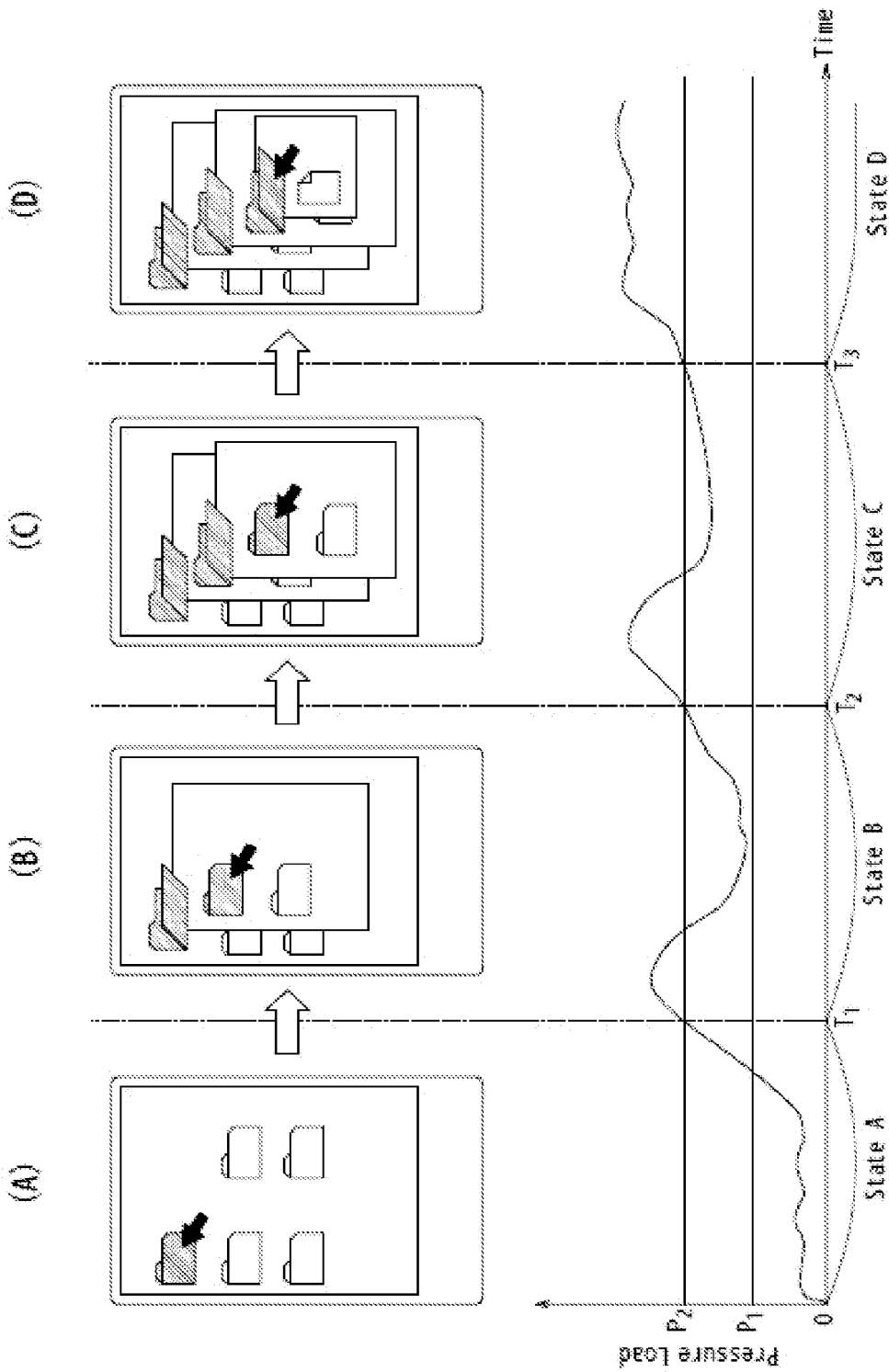
FIG. 7 shows diagrams illustrating a specific example of repetitive opening operations of folders by the mobile phone shown in FIG. 1.

As described above, since the present embodiment allows for repetitive opening operations of the folder, the user can open folders on lower levels of a folder one after another as shown in FIG. 7, for example.

Meanwhile, if the pressure load changing from the state satisfying the second load standard, lower than the first load standard, to the state not satisfying it is detected at step S17, the control unit 20 controls to close the folder being open on the display unit 32 (step S18). In this case, the control unit 20 closes the lowest folder among the open folders on the display unit 32. That is, the control unit 20 restores the display of the display unit 32 to hide the icon of the file and/or subfolder located one level below the lowest folder among the open folders.

After step S18, the control unit 20 determines whether the input unit 34 is detecting a pressing input (step S19). The control unit 20 returns to step S11 to continue the processing if the pressing input is detected, otherwise ends the processing.

According to the present embodiment, as described above, the user can repeat the closing operation of the folder without removing the finger from the input unit 34 of the touch panel 30. Accordingly, the user can continuously perform the operation to close the lowest folder to return to one higher-level folder, as shown in FIG. 8, for example.

Figure 11:
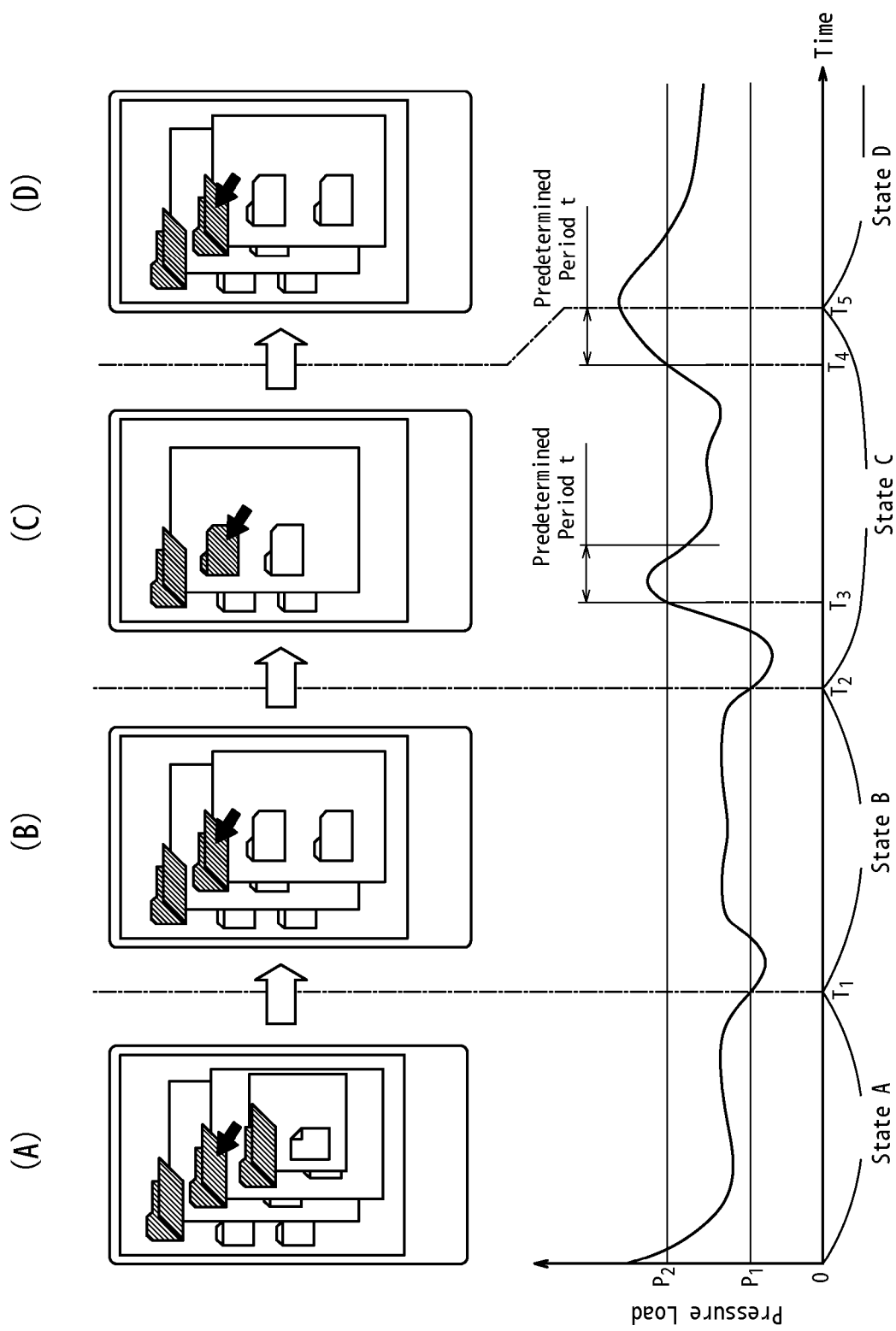
FIG. 11 is a diagram illustrating a specific example of an operation based on processing according to the embodiment of the present invention.
Figure 12:
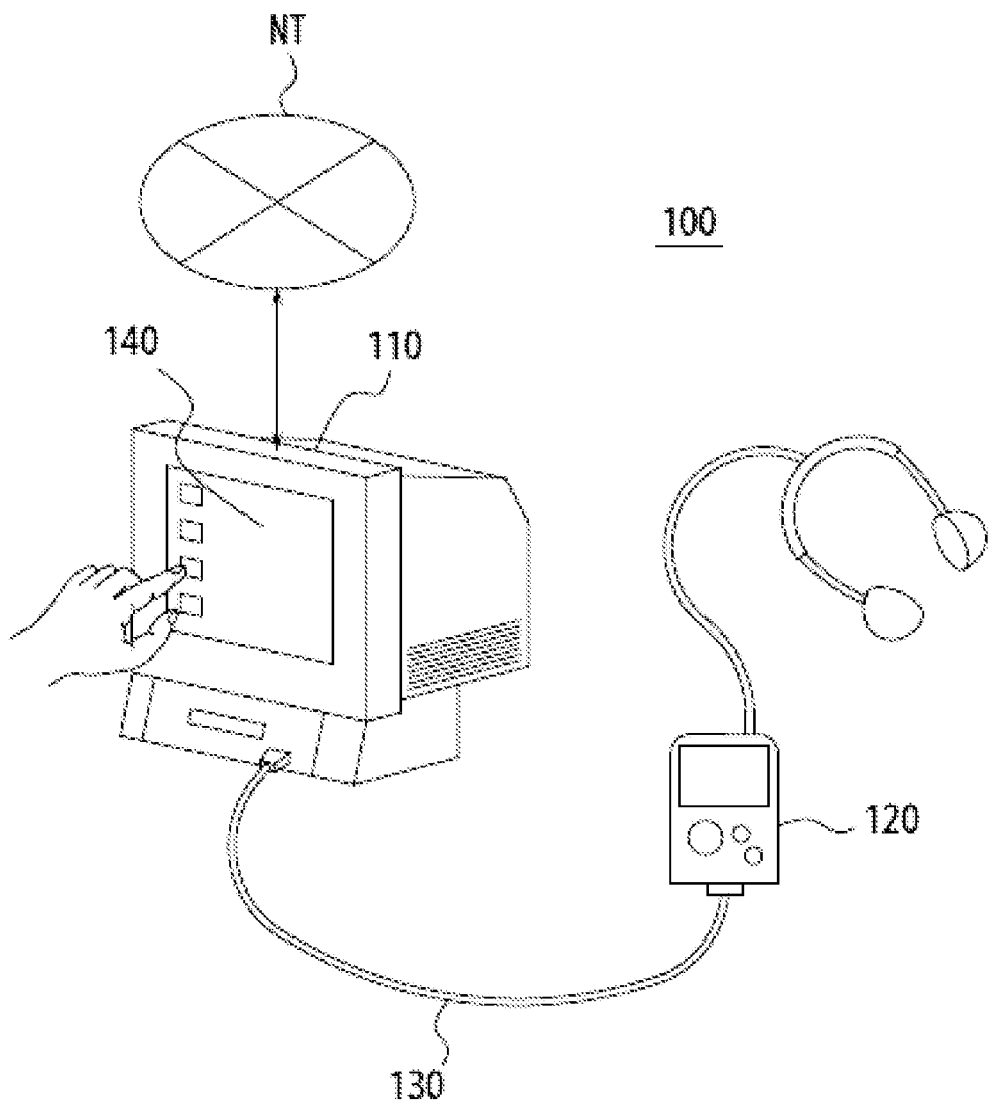
FIG. 12 is a diagram illustrating a schematic configuration of a data transfer system including an information processing apparatus according to the conventional arts.

FIG. 11 is a diagram illustrating a specific example of the operation for avoiding the erroneous operation in the opening operation and the closing operation of the folder according to the present embodiment. FIG. 11 shows, in performing the processing described above, the temporal change in the pressure load to the input unit 34 of the touch panel 30 detected by the load detection unit 40 in a lower half, and the transition of the display of the display unit 32 associated with the temporal change in an upper half. In FIG. 11 also, the first load standard in the processing described above is represented by the "load standard P2", whereas the second load standard is represented by the "load standard P1."

FIG. 11(A) shows a state A that the user gradually reduces the pressure of a pressing input after touching the input unit 34 of the touch panel 30 with the finger or the like. The graph in the lower half of FIG. 11(A) shows a state that the user gradually reduces the pressure on the touch panel 30, once maintains the pressure and then reduces it again. A hatched object of the folder in the display of the display unit shown in the upper half of FIG. 11(A) corresponds to a position on the input unit 34 where the input is detected. If there is an object of a folder or a file at a position on the input unit 34 where the input is detected as described above, the control unit 20 performs processing such as, for example, to color the object in order to show the user that the input to the object is being detected. In FIG. 11(A), an arrow provided at one of the hatched folders indicates that the input by the user's finger or the like is being detected at the position. It is possible to set to either display or hide such an object indicating the input position on the display unit 32.

In FIG. 11(A), the display unit 32 displays three open folders. That is, contents of a first-level folder to a third-level folder are displayed. In FIG. 11(A), the user is pressing a position of the folder indicated by the arrow on the input unit 34 of the touch panel 30. According to the present embodiment, however, in order to close the folder, the user can input with the pressure load changing from the state satisfying the second load standard P1 to the state not satisfying it, anywhere on the input unit 34. Accordingly, if the pressure load on the input unit 34 changes from the state satisfying the second load standard P1 to the state not satisfying it (Yes of step S17), the lowest folder being open is closed as shown in the upper half of FIG. 11(B) (step S18).

Subsequently, the user can close another folder by increasing the pressure load on the input unit 34 to satisfy the second load standard P1 and then reducing it under the second load standard P1. That is, if the pressure load on the input unit 34 changes again from the state satisfying the second load standard P1 to the state not satisfying it (Yes of step S17), the lowest folder being open is closed as shown in the upper half of FIG. 11(C) (Step S18).

Then, since the user increases the pressure which has not satisfied the second load standard P1 in a state C in FIG. 11(C), the pressure load detected by the load detection unit 40 becomes to satisfy the first load standard P2 after time T3 (Yes of step S11). Here, the position receiving the pressing input corresponds to the position of the object of the folder displayed on the display unit 32, as shown in FIG. 11(C) (Yes of step S12). As shown after the time T3 in FIG. 11, however, since the duration exceeding the first load standard P2 is within a predetermined period t (No of step S14) and then the pressure load under the first load standard P2 is detected again (Yes of step S15), the folder is not opened. In this case, that is, processing at step S16 is not carried out.

Accordingly, even if the user performs an erroneous operation unintentionally adding too much pressure, the folder will not be opened against the user's intention as long as such an operation lasts shorter than the predetermined period. After this, the user can continue the operation to close yet another folder by reducing the pressure again such that the pressure load falls under the second load standard P1.

Also, at an end of the state C shown in FIG. 11(C), since the user increases the pressure which has not satisfied the first load standard P2, the pressure load detected by the load detection unit 40 starts satisfying the first load standard P2 after time T4 (Yes of step S11). Here, as shown in FIGS. 11(C) and (D), the position receiving the pressing input corresponds to the position of the object of the folder displayed on the display unit 32 (Yes of step S12). In this case, since the duration satisfying the first load standard P2 exceeds the predetermined period t as shown at the time T4 and thereafter in FIG. 11 (Yes of step S14), the folder receiving the pressing input is opened at time T5 as shown in a state D in FIG. 11(D) (step S16).

Accordingly, if the user intentionally increases the pressure for the predetermined period or longer, the folder on which the pressing input is being detected is opened as intended by the user. As stated above, the input apparatus according to the present embodiment can handle erroneous operations unintended by the user, which allows the user to perform operations as intended.

It is to be noted that, in the above description, the load standard is used as a "pressure load threshold" and it is determined that "the load standard is satisfied" when the pressure load reaches the load standard. However, this is not an only condition to be determined that "the load standard is satisfied", but there are various conditions to be determined so. For example, it is possible to determine that "the load standard is satisfied" when the pressure load of the pressing input to the object by the user exceeds the above load standard. In addition, it is also possible to determine that "the load standard is satisfied" when the pressure load indicating the above load standard is detected by the load detection unit 40.

The same applies to a condition to determine "the load standard is not satisfied" in the above description. That is, in the above description, it is determined that "the load standard is not satisfied" when the pressure load becomes under the load standard. However, it is also possible to determine that "the load standard is not satisfied" when, for example, the pressure load of the pressing input to the object by the user becomes equal to or under the load standard. In addition, it is also possible to determine that "the load standard is not satisfied" when the pressure load indicating the above load standard is no longer detected by the load detection unit 40.

It is to be understood that the present invention is not limited to the embodiment set forth above but may be modified or varied in a multiple manner. For example, although it is assumed in the above embodiment that the load standards are set in advance, it is preferable to allow the user to change or adjust them suitably as necessary. Thereby, it allows the user to appropriately adjust them later in case the user feels uncomfortable with them during the operations.

In the above embodiment, additionally, the object of the folder or the like is colored to show the user that an input to the object is detected or to show the folder to be closed in the above embodiment. However, it is also possible to vibrate the vibration unit 50 instead of, or in addition to, coloring the object upon detection of an input thereto, to allow the user to recognize accordingly. In such a case, moreover, it is also possible, for example, to generate particular sound from the audio output unit 80 other than generating the vibration to allow the user to recognize accordingly.

Moreover, if, for example, a pressure load satisfying each predetermined load standard is detected and/or if a pressure load no longer satisfying the predetermined load standard is detected, the vibration unit 50 may be vibrated and/or the audio output unit 80 may generate particular sound as described above. It thereby allows the user to easily recognize that appropriate processing is being carried out in response to his/her input.

Further, although the input apparatus has the touch panel 30 in the above embodiment of the present invention, the present invention is applicable also to input apparatuses without the touch panels.

For example, it is also possible to configure the input apparatus such that a folder is specified by a pointing device, such as a direction indicator key or a direction indicator device for moving a pointer displayed on the display unit 32, and the load detection unit detects the pressure on the pointing device applied by the user. Such a direction indicator key or direction indicator device may be a mechanical switch included in the key input unit 90 disposed on a body of the mobile phone 10.

In addition, such a pointing device is not limited to those disposed on the body of the mobile phone 10 but may be a pointing device such as, for example, a mouse which is externally connected. Providing a load detection unit configured to detect a pressure applied by the user on a button of the pointing device allows for detection of a pressure when the button is further pressed while clicking.

REFERENCE SIGNS LIST

10 mobile phone
20 control unit
22 timer unit
30 touch panel
32 display unit
34 input unit
40 load detection unit
50 vibration unit
60 memory unit
70 audio input unit
80 audio output unit
90 key input unit

The invention claimed is:
1. An input apparatus comprising:
a display unit configured to display objects of folders;
an input unit configured to detect a pressing input to the display unit;
a load detection unit configured to detect a pressure load on the input unit; and
a control unit configured to control, at a position of an object of a folder, opening of the folder when the pressure load satisfying a first load threshold is detected for a predetermined period of time with pressing input at a position of the displayed folder, and closing of the opened folder when the load detection unit detects the pressure load changing from a state of satisfying a second load threshold lower than the first load threshold with the detected pressure load being between the first load threshold and the second load threshold to a state of not satisfying the second load threshold,
wherein a position of pressing input at the time of closing of the opened folder is at any position on the input unit.

* * * * *